(12) United States Patent
Kim et al.

(10) Patent No.: US 6,591,110 B1
(45) Date of Patent: Jul. 8, 2003

(54) METHOD OF DETECTING AND CALCULATING EXTERNAL JAMMER SIGNAL POWER IN COMMUNICATION SYSTEMS

(75) Inventors: Kyoung Il Kim, Bridgewater, NJ (US); Alexandro Federico Salvarani, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 421 days.

(21) Appl. No.: 09/604,574

(22) Filed: Jun. 27, 2000

(51) Int. Cl.⁷ ................................................ H04Q 7/20
(52) U.S. Cl. ................ 455/453; 455/436; 455/423; 455/67.1; 455/454; 455/424; 455/67.3; 370/332; 370/333; 375/224; 375/227
(58) Field of Search .................... 455/453, 423, 455/422, 67.1, 226.1–226.3, 436, 26.1, 454, 424, 67.3, 296; 375/285, 224, 227, 254, 296, 346, 348; 370/332, 333, 334

(56) References Cited

U.S. PATENT DOCUMENTS

| | | | | |
|---|---|---|---|---|
| 5,157,709 A | * | 10/1992 | Ohteru | 455/465 |
| 5,285,447 A | * | 2/1994 | Hulsebosch | 370/332 |
| 5,603,092 A | * | 2/1997 | Stjernholm | 455/63 |
| 5,762,190 A | * | 6/1998 | Leistner | 206/347 |
| 5,950,110 A | * | 9/1999 | Hendrickson | 455/1 |
| 6,229,998 B1 | * | 5/2001 | Hamdy et al. | 455/226.1 |
| 6,393,276 B1 | * | 5/2002 | Vanghi | 455/422 |
| 6,456,850 B1 | * | 9/2002 | Kim et al. | 455/453 |

* cited by examiner

*Primary Examiner*—Edward F. Urban
*Assistant Examiner*—Marceau Milord

(57) ABSTRACT

A method for detecting and calculating the contribution by external jammer signals to the total power received by a reverse link of a communication system. The total received power for a reverse link is measured. Calculations of load estimates based on power rise due to background noise and total $E_b/N_0$ are performed. The contribution of external jammer signals to the total power received is calculated from the load estimates. The ability to calculate the power level of external jammer signals for a certain reverse link allows a service provider to more efficiently use the capacity of the reverse link. An average of the calculated external jammer power level can be calculated over a period of time defined by the service provider of the communication system.

7 Claims, 2 Drawing Sheets

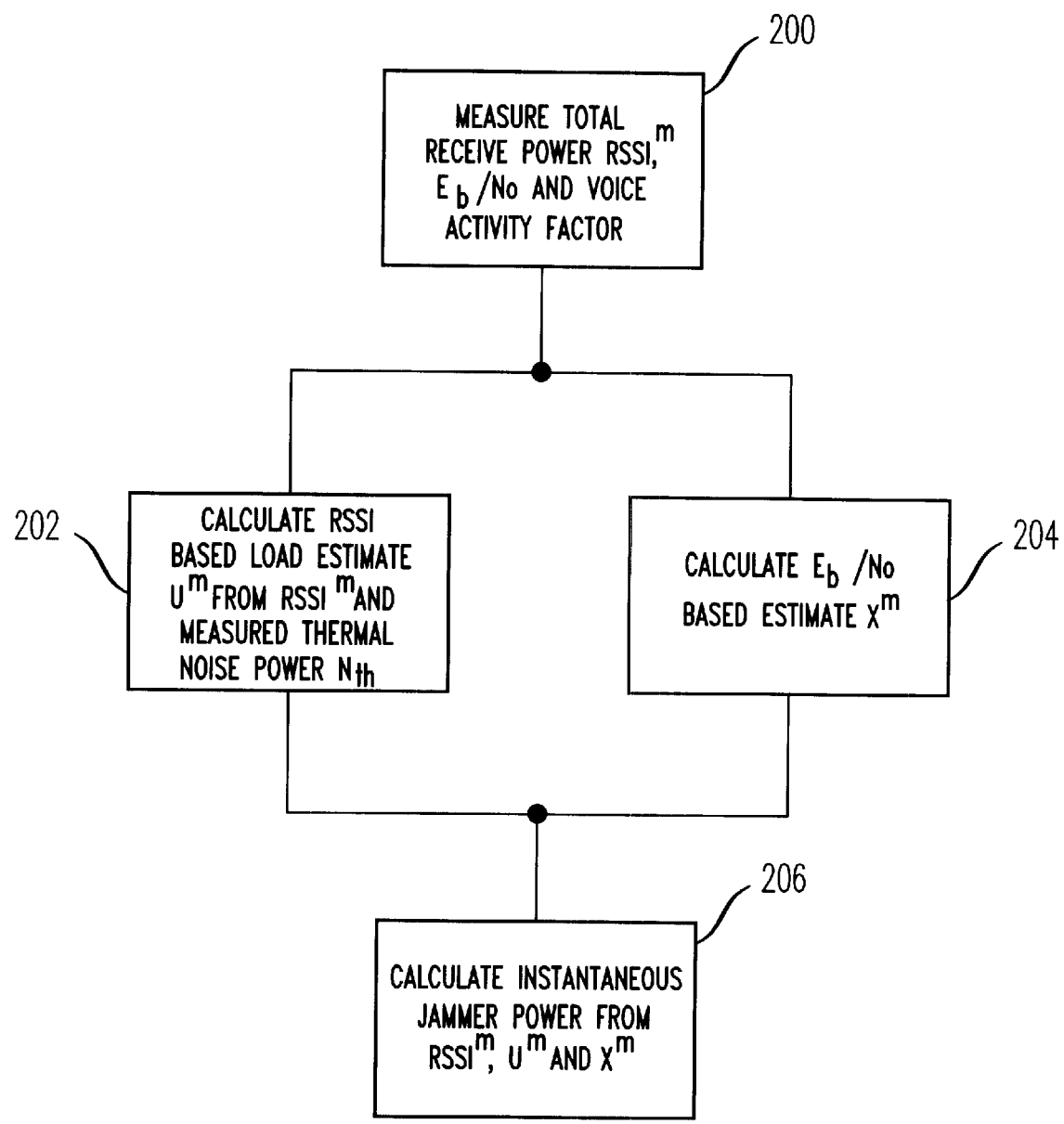

METHOD OF DETECTING AND CALCULATING EXTERNAL JAMMER SIGNAL POWER IN COMMUNICATION SYSTEMS

BACKGROUND OF THE INVENTION

1. Field of the Invention

The present invention is generally related to a method for detecting and calculating the contribution of external jammer signals to total power received in a reverse link of a communication system.

2. Description of the Related Art

Communication systems, and in particular, wireless communication systems comprise a plurality of communication channels through which subscribers of such systems communicate with each other and with the system. Wireless communication systems such as Code Division Multiple Access (CDMA) systems and other communication systems have a certain capacity; that is they are limited by the amount of communication channels that can be made available to subscribers of such systems. The capacity of a communication system is the amount of total information per unit time (i.e., information rate, $R_T$) that can be conveyed (within the system) while maintaining an acceptable quality of communications. The acceptable quality of communications is typically defined by the operator (or service provider) of the communication system. Usually, the capacity is directly related to the number of subscribers using the system; the more subscribers using the system the higher the information rate.

Referring to FIG. 1 there is shown part of a typical topography of a cellular CDMA wireless communication system. The communication system depicted in FIG. 1 comprises a plurality of cells each of which delineates a particular geographical area or terrain that is covered by the communication system. The cells have borders which form hexagons. The hexagons (108, 114, 110, 112) symbolically represent areas of coverage within which subscribers located in the same cell communicate with the cell (i.e., cell system equipment). Each cell has system equipment (owned and controlled by a system operator or service provider) that are used by the system to admit subscribers to the system; that is to allow subscribers of the system to gain access to the communication system for communicating with each other and/or with the system. At least part of the system equipment is typically located at a base station (e.g., 100, 102, 104, 106). Some of the system equipment at the base stations are Radio Frequency (RF) transmitters and receivers for conveying (i.e., transmitting and receiving) communication signals.

Other system equipment, which can also be located at a base station, provide the Operations, Administration and Maintenance (OA&M) services typically associated with communications equipment. For example, subscriber billing, allocating communication channels for subscribers, and giving subscribers access to the communication system are some of the services provided by the OA&M equipment. Subscribers given access to the communication system can communicate with other subscribers via the cell's base station.

For a CDMA communication system, such as the one depicted in FIG. 1, a subscriber gains access by making a request to system equipment (usually located at a base station). For example, subscriber 124 in cell 112 makes a request to base station 100 to have access to the communication system. System equipment at base station 100 receive the request and decide whether to give subscriber 124 access to the communication system. Subscriber 124 and base station 100 (as well as other base stations and subscribers) communicate via communication channels called forward links and reverse links. A forward link is a communication channel through which base station 100 transmits communication signals to subscriber 124. A reverse link is a communication channel through which subscriber 124 transmits communication signals to base station 100. Thus, each subscriber has a forward link and a reverse link that it uses to communicate with system equipment and/or with other subscribers of the communication system.

Typically, the system decides to provide access to a subscriber by performing a power level analysis that attempts to maintain the quality of communications between subscribers at an acceptable level as defined by the system operator. The system could continue to admit subscribers requesting communication services (or continue to respond to a system request or "page" to admit subscribers) and thus continue to increase its information rate. At some point an overload condition will occur causing the quality of communications provided by the communication system to be degraded. An overload condition occurs when the information rate of the communication system causes the quality of communications (e.g., existing voice and/or data calls) to drop below an acceptable level set by the system operator. Usually the acceptable level is set as a threshold below the system's ultimate capacity. One example of an overload condition is when a cell communicates with a relatively large number of subscribers such that the system cannot meet the desired signal to noise ratio (SNR) requirement. The number of subscribers that can be adequately serviced by a cell depends on the SNR usually expressed in terms of a ratio, $$\frac{E_b}{N_0},$$

where $E_b$ represents the total received signal energy per unit of information (e.g., energy per bit) and $N_0$ represents the total noise power density. The higher the $$\frac{E_b}{N_0}$$

of the signal measured at a receiver, the better the quality of communications.

The following equation defines the reverse-link signal to noise ratio $$\left(\frac{E_b}{N_0}\right)^m_{i,k}$$

for subscriber i in cell k as measured by cell m:

$$\left(\frac{E_b}{N_0}\right)^m_{i,k} = \frac{\left(\frac{W}{R}\right)_{i,k} \times S^m_{i,k}}{N_{th} + J + \sum\limits_{\substack{j=1 \\ j \neq i}}^{M_k} v_{j,k} S^m_{j,k} + \sum\limits_{\substack{l=1 \\ l \neq k}}^{L} \sum\limits_{j=1}^{M_l} v_{j,l} S^m_{j,l}} \quad (1)$$

The indices i and j designate particular subscribers and the indices k, l and m designate particular cells. $M_l$ is the number of subscribers in cell l, $M_k$ is the number of subscribers in cell k, L is the total number of cells in the system, $$\left(\frac{W}{R}\right)_{i,k}$$

is called the processing gain for subscriber i in cell k where W is the bandwidth or a CDMA carrier signal and R is the information rate of subscriber i. The average power of the reverse-link signal is defined as the product of the power level (S) and the voice activity factor (v) of the reverse-link signal. In equation (1) above, $S_{j,k}^m$ is the power level of the communication signal of subscriber j in cell k as measured at cell m, and the voice activity $v_{j,k}$ represents how often subscriber j in cell k speaks during a telephone conversation or how often a data energy burst is transmitted by the subscriber. $N_{th}$ represents the power level of thermal noise typically generated by electrical and electronic circuitry. J represents the power level of any external jammer signals, which is a type of interference. Any signal other than a subscriber's communication signal is called interference. Two major sources of interference are thermal noise and external jammer signals. An external jammer signal is any signal not generated by the communication system, but is received by the communication system or received by a subscriber of the communication system. For example, an external jammer interfering with a CDMA communication system is an analog mobile telephone user transmitting signals whose frequency spectrum is partially or entirely the same as the spectral band of the CDMA system; in such a situation the analog mobile signal interferes with CDMA subscriber signals because the subscriber or the communication system or both receive the analog mobile signal.

The aggregate power received by a base station is due to thermal noise ($N_{th}$), external jammers (J), and the CDMA subscriber signals (vS). Thus, the total received power through a particular reverse link of a base station, which is called the received signal strength indicator (RSSI), has three components and is represented for a particular cell m by the following equation:

$$RSSI^m \equiv N_{th} + J + \sum_{l=1}^{L}\sum_{j=1}^{M_l} v_{j,l} S_{j,l}^m \qquad (2)$$

where the last term on the right-hand side of equation (2) represents the power of CDMA subscriber signals. Note that the RSSI increases when the number of subscribers increases, when the power due to jammer signals increases, and/or even when the thermal noise power increases.

A common and current practice in controlling system overload for a reverse link is to measure the increase in RSSI and decide, based on the RSSI rise, whether to admit to the communication system any additional subscribers who are requesting service. Typically, an RSSI based method is used where the measured RSSI is compared to a threshold and when this measured RSSI is substantially equal to or above the threshold, the system blocks additional access requests from subscribers. Such an RSSI based method assumes that a rise in RSSI is mainly due to the subscribers of the system. Consequently, when the RSSI reaches a system operator defined threshold, no additional subscribers are admitted to the system. The flaw in the RSSI based method is that when a rise in RSSI occurs and such a rise is due to external jammers, the RSSI based method cannot attribute the rise in received power to specifically J or to any particular one of the two other components (i.e., $N_{th}$, υS) of RSSI. In other words, the measured RSSI is an aggregate number and the particular contributions to the RSSI from J cannot be measured directly.

Even though the external jammer signals have virtually no direct effect on a system's capacity, they will affect the coverage of the communication system such as, for example, the coverage of a base station. The external jammer signal power level can be so high that many of the subscribers are not able to communicate with the system equipment because of interference; the only subscribers who are able to communicate with the system are those subscribers who are located relatively close to the base station and can transmit to the base station at a power level high enough to overcome interference. Interference due to external jammers thus directly affects the coverage (of a cell or a communication system) more so than its capacity. The coverage is the area within which communications can occur between a subscriber and system equipment (e.g., a base station). The higher the jammer power J, the smaller the coverage. Note, however, that if the coverage becomes so small that the cell cannot accommodate any subscribers, it will eventually result in a total loss of its capacity.

Both the reduced coverage and capacity loss would cause higher call blocking rate and/or call dropping rate. The call blocking rate refers to the rate at which subscribers requesting access to the communication system are denied access. The call dropping rate refers to the rate at which subscribers who have obtained access to the communication system are removed from the communication system. When a cell exhibits an increased call blocking rate or an increased call dropping rate or both, the service provider needs to have a capability of distinguishing its causes because the measures to be taken to correct the problem (or to improve the call blocking rate/dropping rate) depends on the particular cause of the problem. If the problem is due to the reduced capacity resulting from an increased subscriber loading in the cell, the system operator may choose to lower the threshold for overload control to admit more subscribers into the system at the expense of the quality, or it may choose to deploy more cells and cell equipment to off-load the excessive cell load to its neighbor cells. If the problem is due to the reduced coverage resulting from the presence of external jammers, the system operator would want to locate the source of the jamming power and then remove the jammers to restore proper coverage.

What is therefore needed is a method of determining the contribution of external jammer signals to the measured RSSI so as to better and more efficiently use the capacity of the communication system and, more particularly, use more efficiently the capacity of the reverse links of the communication system.

SUMMARY OF THE INVENTION

The present invention provides a method for detecting and calculating the external jammer signal power received by system equipment in a reverse link of a communication system. The total power received through a reverse link (i.e., RSSI) and the thermal noise power level (i.e., $N_{th}$) are measured, and the $E_b/N_0$ and the voice activities for the reverse link are also measured in well known manners. Load estimates based on the RSSI and the $E_b/N_0$ are calculated; that is, an RSSI based load estimate U and an $E_b/N_0$ based load estimate X are calculated. The external jammer signal power is found to be directly related to the product of the total received power and the difference between the two load estimates. The load estimates are estimates of the cell capacity usage due to subscribers currently using the system. Estimate X is based on the ratio of the total power to background noise where background noise is defined as $N_{th}+J$. Estimate U is based on the ratio of the total power to thermal noise, $N_{th}$. The external jammer signal power J is therefore RSSI×(X−U). Thus, a communication system can more efficiently use the capacity of its reverse links because it can calculate the power from external jammer signals and thus determine whether a rise in RSSI is due to external jammer signals.

In particular, the method of the present invention provides the following steps: first, the total received power(RSSI$^m$) for a reverse link of a cell m and the thermal noise for the system equipment of the cell are measured; the $E_b/N_0$ and the voice activity factor for all users in cell m and its neighbor cells are also measured; second, an RSSI based load estimate for cell m, U$^m$, is calculated from the measured RSSI and $N_{th}$ and an $E_b/N_0$ based load estimate X$^m$, for cell m, is also calculated; third, an instantaneous jammer power J is thus calculated from RSSI$^m$, U$^m$ and X$^m$ where J=RSSI$^m$×(X$^m$−U$^m$). An average jammer power can be calculated by taking the average of instantaneous jammer power levels over a defined time period.

BRIEF DESCRIPTION OF THE DRAWINGS

FIG. 2 is a flow chart of the method of the present invention.

DETAILED DESCRIPTION

Figure 1:
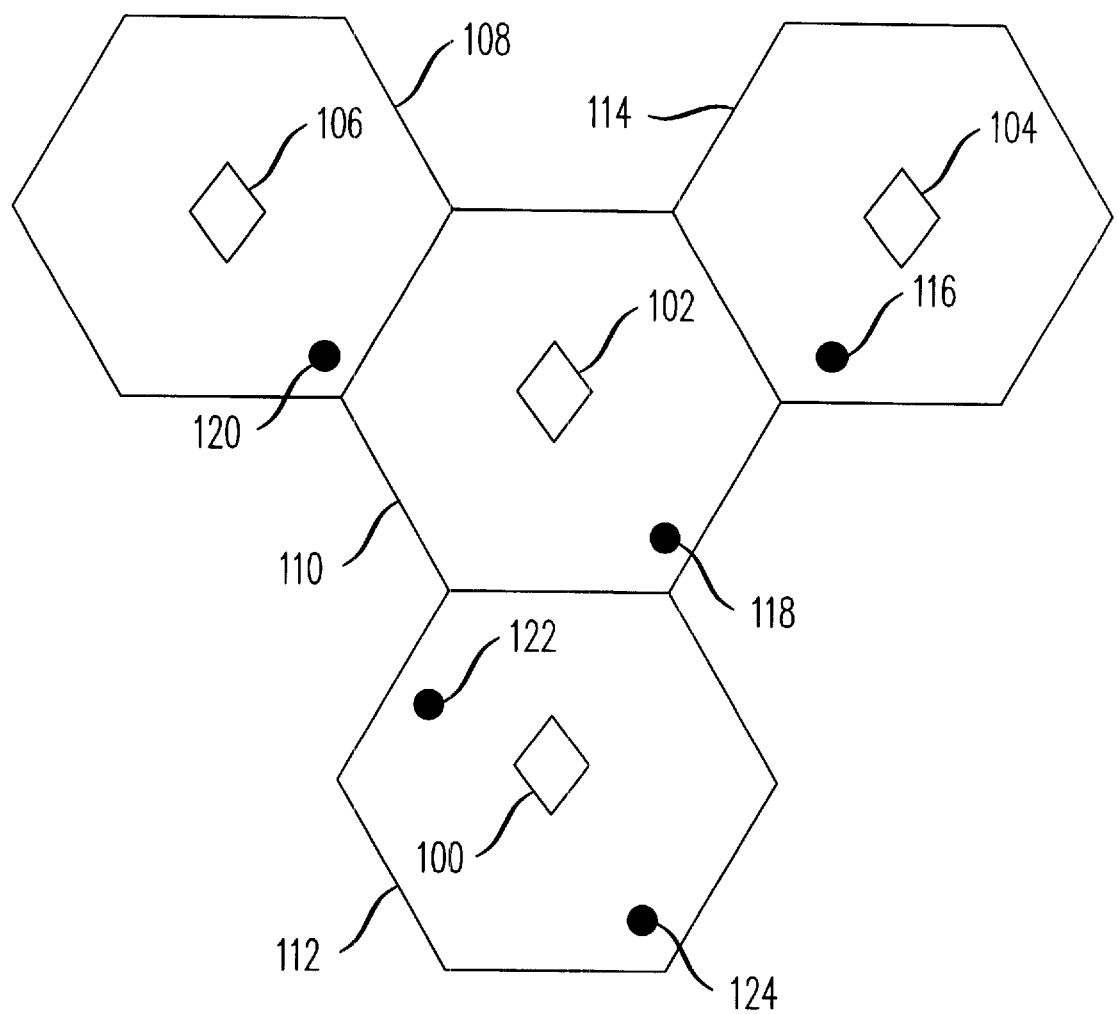
FIG. 1 depicts a typical topography of part of a cellular communication system.

The present invention provides a method for detecting and calculating the external jammer signal power levels received by system equipment through reverse links of communication systems. For a certain cell m, an RSSI based load estimate U$^m$ is calculated from measured RSSI$^m$ and $N_{th}$. An $E_b/N_0$ based load estimate X$^m$ for cell m is calculated from the measured $E_b/N_0$ and voice activity. The difference between the two load estimates, i.e., (X$^m$−U$^m$), is calculated and the external jammer power, J, is calculated as the product of RSSI$^m$ and the difference; in other words, J=RSSI$^m$×(X$^m$−U$^m$). Based on the calculation of J, the method of the present invention allows a service provider to more efficiently use the capacity of the reverse link in cell m. It will be readily understood that the method of the present invention is not limited to CDMA communication systems, but is applicable to any communication systems in which the communication signals of subscribers can use the entire bandwidth of the communication system (i.e., wide band communication systems).

Referring now to FIG. 2, there is shown the steps of the method of the present invention. In step 200, the total received power RSSI$^m$ for a particular reverse link of a cell m is measured. The $E_b/N_0$ and the voice activity factor v for the reverse link are also measured for all subscribers in cell m and its neighbor cells. The neighbor cells of cell m are the cells directly adjacent to cell m and other cells whose signals (from subscribers) are received by cell m. Many communication systems, including CDMA communication system have system equipment that allow a service provider to measure, in well known manners, the total received power of a reverse link and the voice activity factor for a particular user of the reverse link. Similarly, thermal noise can be measured by the same or other system equipment located at a base station or coupled to the base station equipment. The mathematical expressions for the measured $E_b/N_0$ and the measured RSSI were represented as equations (1) and (2) respectively. For ease of reference, equations (1) and (2) are reproduced below:

$$\left(\frac{E_b}{N_0}\right)_{i,k}^m = \frac{\left(\frac{W}{R}\right)_{i,k} \times S_{i,k}^m}{N_{th} + J + \sum_{\substack{j=1 \\ j \neq i}}^{M_k} v_{j,k} S_{j,k}^m + \sum_{\substack{l=1 \\ l \neq k}}^{L} \sum_{j=1}^{M_l} v_{j,l} S_{j,k}^m} \quad (1)$$

$$RSSI^n \equiv N_{th} + J + \sum_{l=1}^{L} \sum_{j=1}^{M_l} v_{j,l} S_{j,l}^m \quad (2)$$

Rearranging equation (1) for RSSI$^m$, the following equation is obtained:

$$RSSI^n = \left(\frac{W}{R}\right)_{i,k} \times \frac{S_{i,k}^m}{\left(\frac{E_b}{N_0}\right)_{i,k}^m} + v_{i,k} S_{i,k}^m = \left[v_{i,k} + \frac{\left(\frac{W}{R}\right)_{i,k}}{\left(\frac{E_b}{N_0}\right)_{i,k}^m}\right] \times S_{i,k}^m \quad (3)$$

$$= \left[1 + \frac{\left(\frac{W}{R}\right)_{i,k}}{v_{i,k}\left(\frac{E_b}{N_0}\right)_{i,k}^m}\right] \times v_{i,k} S_{i,k}^m.$$

The power rise over the background noise is given by:

$$Z_m \equiv \frac{RSSI^n}{N_{th} + J} = 1 + \frac{1}{N_{th} + J} \sum_{l=1}^{L} \sum_{j=1}^{M_l} v_{j,l} S_{j,l}^m = 1 + \quad (4)$$

$$\frac{RSSI^n}{N_{th} + J} \sum_{l=1}^{L} \sum_{j=1}^{M_l} \frac{1}{1 + \frac{\left(\frac{W}{R}\right)_{j,l}}{v_{j,l}\left(\frac{E_b}{N_0}\right)_{j,l}^m}}$$

$$= 1 + Z^m \sum_{l=1}^{L} \sum_{j=1}^{M_l} \frac{1}{1 + \frac{\left(\frac{W}{R}\right)_{j,l}}{v_{j,l}\left(\frac{E_b}{N_0}\right)_{j,l}^m}} = \frac{1}{1 - X^m}$$

where $$X^m \equiv \sum_{l=1}^{L} \sum_{j=1}^{M_l} \frac{1}{1 + \frac{\left(\frac{W}{R}\right)_{j,l}}{v_{j,l}\left(\frac{E_b}{N_0}\right)_{j,l}^m}} \quad (5)$$

X$^m$ is an $E_b/N_0$ based load estimate. Equation (4) can be rewritten in the following form:

$$X_m = 1 - \frac{1}{Z_m} = 1 - \frac{1}{\frac{RSSI^n}{N_{th} + J}} = 1 - \frac{N_{th}}{RSSI^n} - \frac{J}{RSSI^n}. \quad (6)$$

The power rise over thermal noise is referred to as Y$_m$, that is, $$Y^m \equiv \frac{RSSI^m}{N_{th}}. \quad (7)$$

The load estimate based on the power rise defined in equation (7) is:

$$U^m = 1 - \frac{1}{Y^m} = 1 - \frac{N_{th}}{RSSI^m} \quad (8)$$

where $U^m$ is related to $X^m$ as follows:

$$X^m = U^m - \frac{J}{RSSI^m} \text{ or } J = RSSI^m \times (X^m - U^m). \quad (9)$$

In step 202, the RSSI based load estimate $U^m$ is calculated using equation (8). In step 204, the $E_b/N_0$ based load estimate, $X^m$, is calculated using equation (5). In step 206, an instantaneous jammer signal power for a particular user of a particular reverse link is calculated from $X^m$, $U^m$, and $RSSI^m$ as per equation (9). An average jammer power for a particular reverse link in a particular cell can be calculated by taking an arithmetic average of multiple instantaneous jammer signal power levels over a certain time period. Other averaging techniques (e.g., statistical averaging) can also be used to calculate the average jammer signal power. The time period is defined by the service provider. The calculation of the load estimates can be done using system equipment located at a base station or system equipment coupled to the base station.

We claim:

1. A method for detecting and calculating an instantaneous external jammer signal power level received by a reverse link of a communication system, the method comprises:
   measuring in a cell of the communication system an RSSI and thermal noise power level ($N_{th}$) and, for all subscribers in the cell and neighbor cells, measuring a voice activity factor and an $E_b/N_0$;
   calculating a first load estimate based on background noise and a second load estimate based on said $E_b/N_0$; and
   calculating the instantaneous external jammer signal power level from the load estimates and the RSSI.

2. The method of claim 1 where the first load estimate for a cell m is referred to as $U^m$ and is calculated according to the relationship $$U^m = 1 - \frac{N_{th}}{RSSI^m}.$$

3. The method of claim 1 where the second load estimate for a cell m due to users j in a cells l is referred to as $X^m$ and is calculated according to the relationship $$X^m \equiv \sum_{l=1}^{L} \sum_{j=1}^{M_l} \frac{1}{1 + \frac{\left(\frac{W}{R}\right)_{j,l}}{\left(v_{j,l}\left(\frac{E_b}{N_0}\right)\right)_{j,l}^m}}.$$

4. The method of claim 1 where the instantaneous external jammer signal power level for the reverse link is calculated according to the relationship $$J = RSSI^m \times (X^m - U^m).$$

5. The method of claim 4 where an average external jammer signal power level is calculated from multiple instantaneous external jammer signal power levels over a certain time period.

6. The method of claim 4 where the calculation of J is performed by system equipment at a base station or other location of the communication system.

7. The method of claim 1 where the measuring of the RSSI, $N_{th}$, $E_b/N_0$, and the voice activity factor is performed by system equipment located at a base station or other location of the communication system.

* * * * *